United States Patent
Wong (10) Patent No.: US 8,973,382 B2
(45) Date of Patent: Mar. 10, 2015

(54) ENERGY EFFICIENT AIR HEATING, AIR CONDITIONING AND WATER HEATING SYSTEM

(76) Inventor: Lee Wa Wong, Pico Rivera, CA (US)

( * ) Notice: Subject to any disclaimer, the term of this patent is extended or adjusted under 35 U.S.C. 154(b) by 375 days.

(21) Appl. No.: 13/448,827

(22) Filed: Apr. 17, 2012

(65) Prior Publication Data

US 2013/0269378 A1    Oct. 17, 2013

(51) Int. Cl.

| | |
|---|---|
| F25B 29/00 | (2006.01) |
| F16K 11/07 | (2006.01) |
| F24D 3/10 | (2006.01) |
| F24D 11/00 | (2006.01) |
| F24D 19/10 | (2006.01) |
| F25B 13/00 | (2006.01) |

(52) U.S. Cl.
CPC ............. *F25B 13/00* (2013.01); *F16K 11/07* (2013.01); *F24D 3/10* (2013.01); *F24D 11/002* (2013.01); *F24D 19/1015* (2013.01); *F25B 2313/003* (2013.01); *F25B 2313/004* (2013.01); *F25B 2313/021* (2013.01); *F25B 2313/02741* (2013.01); *F25B 2313/0276* (2013.01); *F25B 2313/0292* (2013.01)
USPC ................. 62/159; 62/324.1; 62/196.4

(58) Field of Classification Search
CPC ............................... F25B 2400/0403
USPC ................. 62/159, 160, 324.1, 324.6, 196.4; 137/625, 527, 528
See application file for complete search history.

(56) References Cited

U.S. PATENT DOCUMENTS

| | | | | |
|---|---|---|---|---|
| 4,646,539 | A * | 3/1987 | Taylor | 62/278 |
| 4,766,734 | A * | 8/1988 | Dudley | 62/160 |
| 2005/0167516 | A1* | 8/2005 | Saitoh et al. | 237/2 B |
| 2009/0095005 | A1* | 4/2009 | Dietrich et al. | 62/244 |
| 2009/0199581 | A1* | 8/2009 | Ushijima et al. | 62/238.7 |
| 2011/0154848 | A1* | 6/2011 | Jin | 62/324.6 |

FOREIGN PATENT DOCUMENTS

GB          1289995 A  *  9/1972

* cited by examiner

*Primary Examiner* — Cassey D Bauer
*Assistant Examiner* — Kun Kai Ma
(74) *Attorney, Agent, or Firm* — Novoclaims Patent Services LLC; Mei Lin Wong (57) ABSTRACT

An air heating, air conditioning and water heating system includes a multi-communicative valve unit, a compressor arranged for compressing the refrigerant in a state of superheated vapor, a condenser communicated with the compressor through the multi-communicative valve unit, a heat exchanger communicated with the condenser through the multi-communicative valve unit, an expansion valve, and a water heater communicated with the heat exchanger and the compressor through the multi-communicative valve unit, wherein the multi-communicative valve unit is arranged to be operated to selectively establish at least an air conditioning route, an air heating route, and a water heating route for the refrigerant so that the air heating, air conditioning and water heating system is capable of selectively providing air conditioning, heating and delivering hot water for a predetermined premises.

15 Claims, 5 Drawing Sheets

FIG. 5

ENERGY EFFICIENT AIR HEATING, AIR CONDITIONING AND WATER HEATING SYSTEM

BACKGROUND OF THE PRESENT INVENTION

1. Field of Invention

The present invention relates to a refrigerant system, and more particularly to an air heating, air conditioning and water heating system comprising a multi-communicative valve unit which is capable of providing air conditioning, heating and delivering hot water for a predetermined premises.

2. Description of Related Arts

Figure 1:
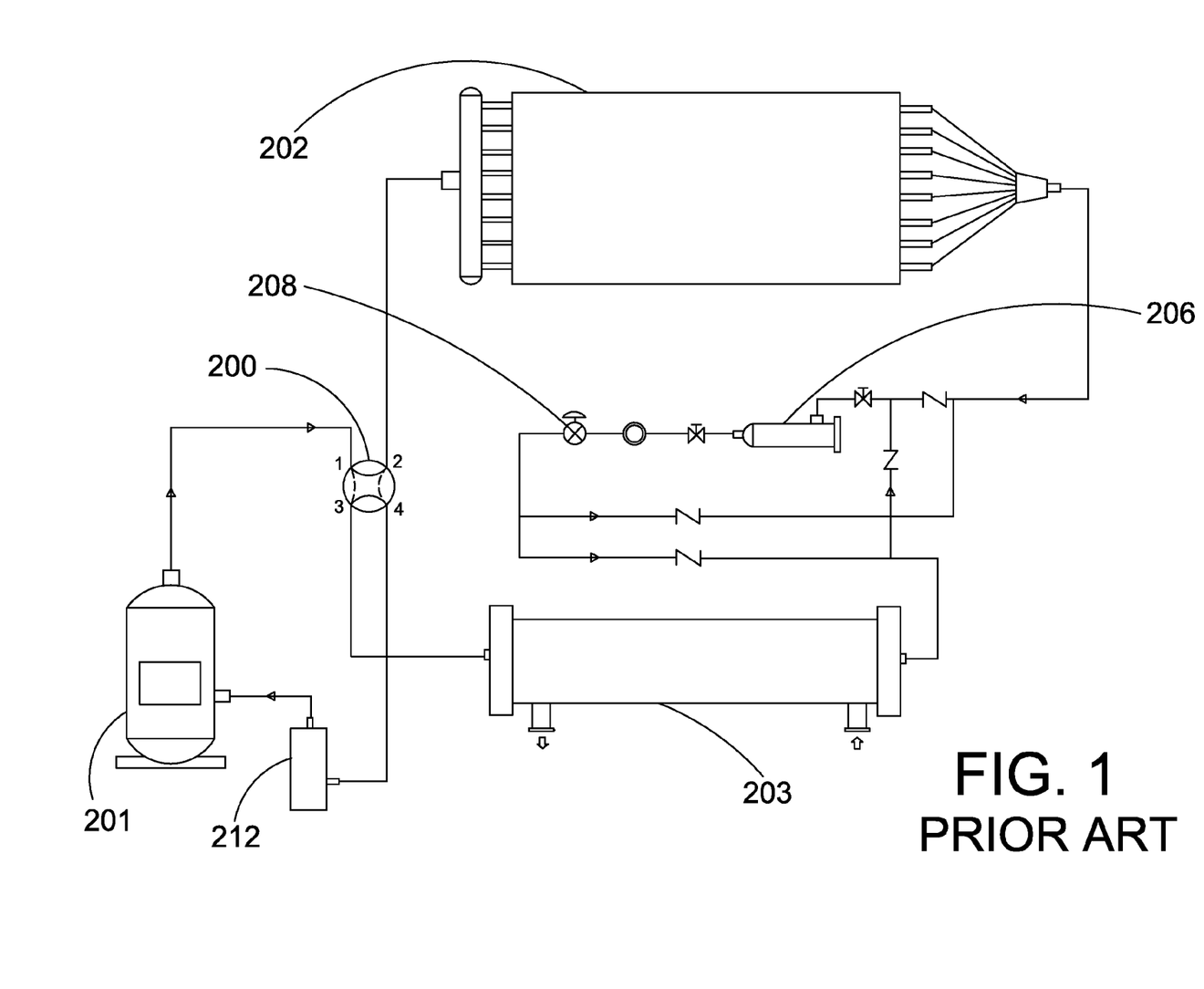
FIG. 1 is a conventional vapor-compression refrigeration system.

Referring to FIG. 1 of the drawings, a conventional vapor-compression refrigeration system usually comprises a compressor 201, a condenser 202, a heat exchanger 203, and a four-way valve 200, and utilize circulating refrigerant as a medium to absorb and remove heat from a predetermined space. The four-way valve 200 has four ports (which are named port 1, port 2, port 3 and port 4 in FIG. 1), and when the vapor-compression refrigeration system is used for air conditioning, port 1 is communicated with port 2 only while port 3 is communicated with port 4 only. This means that refrigerant may enter the four-way valve 200 from port 1 and leave from port 2 or vice versa. Similarly, refrigerant may also enter the four-way valve 200 from port 3 and leave from port 4, or vice versa.

Under this condition, refrigerant circulates in the refrigeration system in a state of saturated vapor and first enters the compressor 201. The compressor 201 is arranged to compress the refrigerant to a higher pressure, and usually to a higher temperature and the refrigerant becomes superheated vapor. The superheated vapor of the refrigerant is arranged to enter port 1 of the four-way valve 200 and leave from port 2 thereof. The refrigerant leaving the four-way valve 200 is then guided to flow into the condenser 202, where the superheated vapor of the refrigerant is then cooled by flowing through a coil or tubes, and cooling agent, such as air or water, is arranged to flow across the coil or the tubes. The refrigerant performs heat exchange with the water flowing in the condenser 202 and a predetermined amount of heat is ejected from the refrigerant. The superheated vapor of the refrigerant is then condensed to become saturated liquid state.

The saturated liquid of the refrigerant is then arranged to flow through an expansion valve 208 and a plurality of other functional valves and a filter dryer 206 and finally reaches the heat exchanger 203. When the refrigerant passes through the expansion valve 208, it undergoes an abrupt reduction in pressure and results in adiabatic flash evaporation. The temperature of the refrigerant is then substantially lowered and is guided to enter the heat exchanger 203. When the refrigerant has entered the heat exchanger 203, it is arranged to perform heat exchange with other heat exchange mediums, such as water, so as to absorb heat from that medium. The refrigerant is then evaporated and leaves the heat exchanger 203. The evaporated refrigerant is then guided to enter port 3 of the four-way valve 200 and is routed to leave the four-way valve 200 from port 4 thereof.

The conventional vapor-compression refrigeration system further comprises an expansion tank 212 connected between the four-way valve 200 and the compressor 201, wherein the refrigerant leaving the four-way valve 200 from port 4 is then guided to flow into the expansion tank 212. The refrigerant leaving the expansion tank 212 is then guided to flow back to the compressor 201 for performing another refrigeration cycle as mentioned above.

When the above mentioned conventional vapor-compression refrigeration system works as a heating system, the refrigerant basically flows in a reverse direction as compared to that mentioned above. In this situation, the four-way valve 200 is operated in such a manner that port 1 is communicated with port 3 while port 2 is communicated with port 4. Thus, the refrigerant leaving the compressor 201 is then arranged to pass through port 1 of the four-way valve 200 and leave the valve from port 3. The superheated vapor of the refrigerant enters the heat exchanger 203 and performs heat exchange with other heat exchange mediums, such as water. Heat is extracted from the refrigerant and the refrigerant becomes liquid state and is arranged to leave the heat exchanger 203. In other words, the heat exchanger 203 in fact works as a condenser for condensing the refrigerant.

The refrigerant is then arranged to flow through the expansion valve 208 and the plurality of other functional valves and the filter dryer 206 in a similar manner mentioned above, and eventually enters the condenser 202. Now, the condenser 202 acts as an evaporator and the refrigerant is arranged to perform heat exchange with other heat exchange mediums, and is arranged to absorb heat from that medium. The result is that the refrigerant is again evaporated and is guided to flow through port 2 and port 4 of the four-way valve 200. The refrigerant is then guided to flow into the expansion tank 212 and back to the compressor 201 for performing another heating cycle.

There exist several disadvantages related to the above mentioned vapor compression refrigeration system. The refrigeration mentioned above has suffered from inefficient energy consumption and when it is installed in a building, it involves very expensive maintenance cost.

Second, the convention refrigeration system such as the one described above does not provide water heating function. As a result, a separate water heating system must be installed in the same building. An essential component of a water heating system is the boiler, which requires a lot of energy to operate (even in idle mode). Moreover, the installation of a separate water heating system requires separate designs and installations of the corresponding piping systems, ventilation systems and fire systems. Furthermore, the maintenance cost of such a separate water heating system is very expensive, and this is in addition to the maintenance cost of the conventional refrigeration system described above.

SUMMARY OF THE PRESENT INVENTION

An object of the present invention is to provide an air heating, air conditioning and water heating system comprising a multi-communicative valve unit which is capable of selectively providing refrigerating and heating function, and delivering hot water for predetermined premises.

Another object of the present invention is to provide an air heating, air conditioning and water heating system which comprising a multi-communicative valve unit, which is capable of selectively connecting different elements or components within the air heating, air conditioning and water heating system so as to establish a plurality of refrigerant flowing routes for selectively facilitating refrigerating, air heating or water heating functions.

Another object of the present invention is to provide an air heating, air conditioning and water heating system which comprising a multi-communicative valve unit, wherein a predetermined amount of heat is extracted from the refrigerant for heating water in the water heating system when the air conditioning or the air heating function is working. In other words, the present invention provides an energy efficient system for selectively heating water, providing air conditioning and air heating functions.

Another object of the present invention is to provide an air heating, air conditioning and water heating system which comprises a multi-communicative valve unit which is capable of establishing a plurality of refrigerant flowing routes for selectively facilitating refrigerating, air heating or water heating functions, wherein these core functions are carried out efficiently and effectively.

Another object of the present invention is to provide a multi-communicative valve for an air heating, air conditioning and water hefting system which is capable of selectively providing refrigerating and heating function, and delivering hot water for predetermined area.

Accordingly, in order to accomplish the above objects, the present invention provides an air heating, air conditioning and water heating system, comprising:

a plurality of connecting pipes adapted for carrying a flow of a predetermined amount of refrigerant;

a multi-communicative valve unit;

a compressor arranged for compressing the refrigerant in a state of superheated vapor;

a condenser communicated with the compressor through the multi-communicative valve unit and the connecting pipes, wherein a first predetermined amount of heat exchange medium circulates through the condenser;

a heat exchanger communicated with the condenser through the multi-communicative valve unit and the connecting pipes, wherein a second predetermined amount of heat exchange medium circulates through the heat exchanger;

an expansion valve communicative between the heat exchanger and the condenser; and a water heater communicated with the heat exchanger and the compressor through the multi-communicative valve unit and the heat exchanging pipes, wherein the water heater is arranged to store a predetermined amount of water, wherein the multi-communicative valve unit selectively defines at least an air conditioning route, an air heating route, and a water heating route for the refrigerant, (i) wherein in the refrigeration route, the refrigerant in superheated vapor state is arranged to sequentially flow into the water heater from the compressor for releasing a predetermined of heat into the water stored in the water heater for producing a predetermined amount of heated water, wherein the refrigerant leaving the water heater is guided to flow into the condenser through the multi-communicative valve unit for extracting a predetermined amount of heat to the first predetermined heat exchange medium, wherein the refrigerant leaving the condenser is arranged to flow into the heat exchanger through the expansion valve and the multi-communicative valve unit for absorbing a predetermined amount of heat from the second predetermined heat exchange medium, wherein the refrigerant leaving the heat exchanger is arranged to flow into the compressor through the multi-communicative valve unit to perform another heat exchange cycle for producing refrigeration;

(ii) wherein in the air heating route, the refrigerant in superheated vapor state is arranged to sequentially flow into the water heater from the compressor for releasing a predetermined amount of heat into the water stored in the water heater for producing a predetermined amount of heated water, wherein the refrigerant leaving the water heater is guided to flow into the heat exchanger through the multi-communicative valve unit for extracting a predetermined amount of heat to the first predetermined heat exchange medium, wherein the refrigerant leaving the heat exchanger is arranged to flow into the condenser through the expansion valve and the multi-communicative valve unit for absorbing a predetermined amount of heat from the second predetermined heat exchange medium, wherein the refrigerant leaving the condenser is arranged to flow into the compressor through the multi-communicative valve unit to perform another heat exchange cycle for producing air heating; and (iii) wherein in the water heating route, the refrigerant in superheated vapor state is arranged to sequentially flow into the water heater from the compressor, wherein the refrigerant for extracting a predetermined amount of heat to the water stored in the water heater, wherein the refrigerant leaving the water heater is guided to flow into the condenser through the multi-communicative valve unit for absorbing heat from the first predetermined heat exchange medium, wherein the refrigerant leaving the condenser is arranged to flow into the compressor through the multi-communicative valve unit to perform another heat exchange cycle for producing heated water in the water heater.

These and other objectives, features, and advantages of the present invention will become apparent from the following detailed description, the accompanying drawings, and the appended claims.

DETAILED DESCRIPTION OF THE PREFERRED EMBODIMENT

Figure 2:
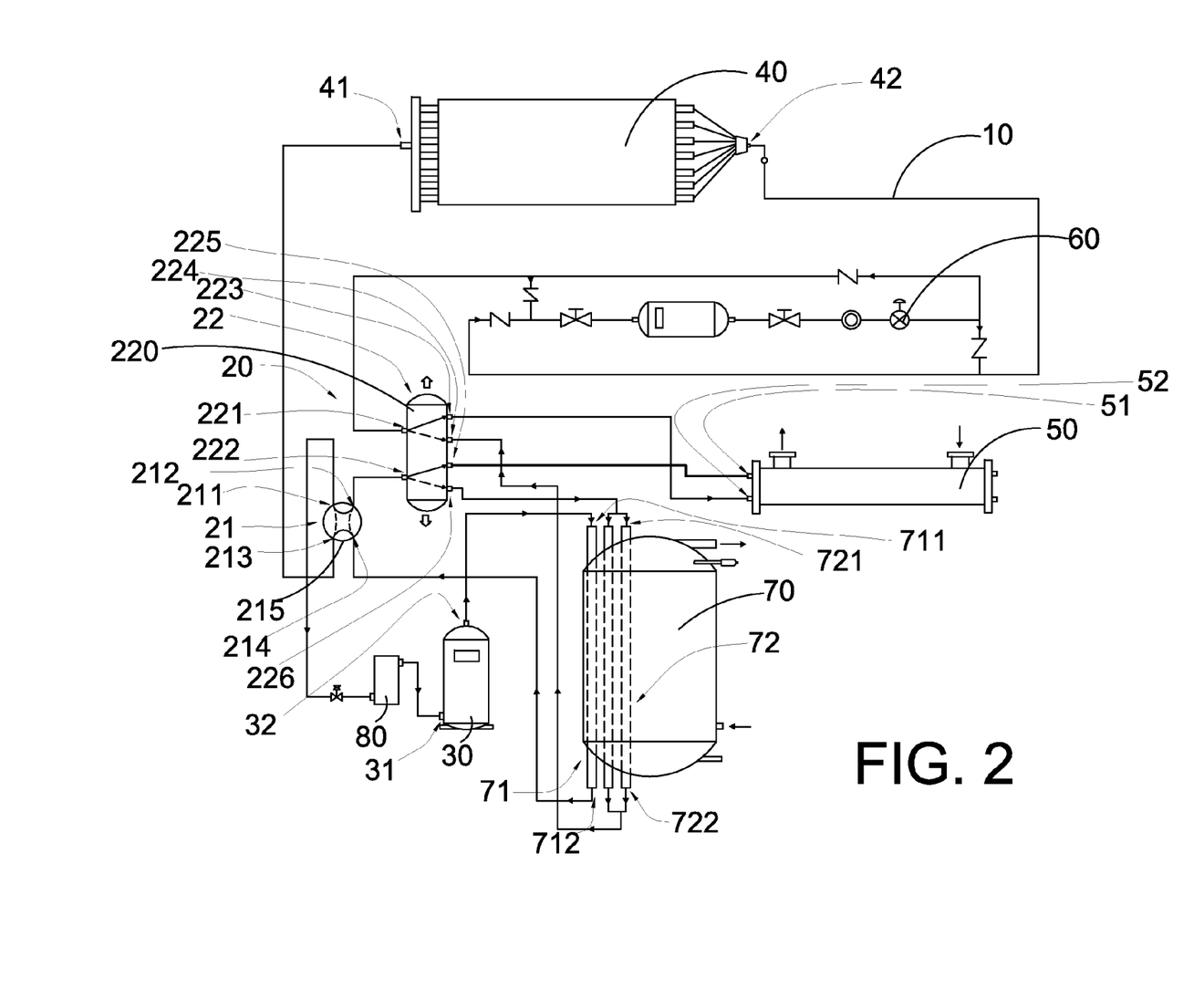
FIG. 2 is a schematic diagram of an air heating, air conditioning and water heating system according to a preferred embodiment of the present invention.

Referring to FIG. 2 of the drawings, an air heating, air conditioning and water heating system according to a preferred embodiment of the present invention is illustrated, in which the air heating, air conditioning and water heating system comprises a plurality of connecting pipes 10 pipes adapted for carrying a flow of a predetermined amount of refrigerant, a multi-communicative valve unit 20, a compressor 30 arranged for compressing the refrigerant in a state of superheated vapor, a condenser 40, a heat exchanger 50, an expansion valve 60, and a water heater 70.

The condenser 40 is communicated with the compressor 30 through the multi-communicative valve unit 20 and the connecting pipes 10, wherein a first predetermined amount of heat exchange medium circulates through the condenser 40.

The heat exchanger 50 is communicated with the condenser 40 through the multi-communicative valve unit 20 and the connecting pipes 10, wherein a second predetermined amount of heat exchange medium circulates through the heat exchanger 50. The expansion valve 60 communicates between the heat exchanger 50 and the condenser 40.

The water heater 70 is communicated with the heat exchanger 50 and the compressor 30 through the multi-communicative valve unit 20 and the connecting pipes 10, wherein the water heater 70 is arranged to store a predetermined amount of water.

The multi-communicative valve unit 20 is arranged to be operated to selectively establish at least an air conditioning route, an air heating route, and a water heating route for the refrigerant, wherein in the air conditioning route, the refrigerant in superheated vapor state is arranged to sequentially flow into the water heater 70 from the compressor 30 for releasing a predetermined of heat into the water stored in the water heater 70 for producing a predetermined amount of heated water, wherein the refrigerant leaving the water heater 70 is guided to flow into the condenser 40 through the multi-communicative valve unit 20 for extracting a predetermined amount of heat to the first predetermined heat exchange medium, wherein the refrigerant leaving the condenser 40 is arranged to flow into the heat exchanger 50 through the expansion valve 60 and the multi-communicative valve unit 20 for absorbing a predetermined amount of heat from the second predetermined heat exchange medium, wherein the refrigerant leaving the heat exchanger 50 is arranged to flow into the compressor 30 through the multi-communicative valve unit 20 to perform another heat exchange cycle for producing refrigeration. In this air conditioning route, the air heating, air conditioning and water heating system is capable of simultaneously accomplishing air conditioning and delivering heated water to user of the present invention. Moreover, the heat energy used for heating the water in the water heater 70 is provided through the superheated vapor in the refrigerant. Thus, the present invention effectively saves energy as compared to traditional HVAC system and water heating system, because water is not solely heated by electricity or gas.

On the other hand, when the multi-communicative valve unit 20 is operated to establish the air heating route, the refrigerant in superheated vapor state is arranged to sequentially flow into the water heater 70 from the compressor 30 for releasing a predetermined amount of heat into the water stored in the water heater 70 for producing a predetermined amount of heated water, wherein the refrigerant leaving the water heater 70 is guided to flow into the heat exchanger 50 through the multi-communicative valve unit 20 for extracting a predetermined amount of heat to the first predetermined heat exchange medium, wherein the refrigerant leaving the heat exchanger 50 is arranged to flow into the condenser 40 through the expansion valve 60 and the multi-communicative valve unit 20 for absorbing a predetermined amount of heat from the second predetermined heat exchange medium, wherein the refrigerant leaving the condenser 40 is arranged to flow into the compressor 30 through the multi-communicative valve unit 20 to perform another heat exchange cycle for producing air heating. In this air heating route, the air heating, air conditioning and water heating system is capable of simultaneously accomplishing air heating and delivering heated water to user of the present invention. Again, the heat energy used for heating the water in the water heater 70 is provided through the superheated vapor in the refrigerant. Thus, the present invention effectively saves energy as compared to traditional HVAC system and water heating system, because water is not solely heated by electricity or gas.

Furthermore, when the multi-communicative valve unit 20 is operated to establish the water heating route, the refrigerant in superheated vapor state is arranged to sequentially flow into the water heater 70 from the compressor 30, wherein the refrigerant is adapted for releasing a predetermined amount of heat to the water stored in the water heater 70, wherein the refrigerant leaving the water heater 70 is guided to flow into the condenser 40 through the multi-communicative valve unit 20 for absorbing heat from the first predetermined heat exchange medium, wherein the refrigerant leaving the condenser 40 is arranged to flow into the compressor 30 through the multi-communicative valve unit 20 to perform another heat exchange cycle for producing heated water in the water heater 70. This route is used only when the air conditioning route and the air heating route as described above is not in operation. In such situation, superheated refrigerant vapor is used to heat up the water stored in the water heater 70. However, there is no need to have an extra water heating system installed in the same area or premises. This substantially saves maintenance costs as compared to separate HVAC system and water heating system.

According to the preferred embodiment of the present invention, the multi-communicative valve 20 comprises a four-way valve 21 and a multi-communicative valve 22 connected to the four-way valve 21. As shown in FIG. 2 of the drawings, the four-way valve 21 comprises a valve body 215, and has first through fourth flowing port 211, 212, 213, 214 formed on the valve body 215 and are connected with the corresponding connecting pipes 10, wherein the first flowing port 211 is selectively communicated with one of the second flowing port 212 and the third flowing port 213, and the second flowing port 212 is selectively communicated with one of the first flowing port 211 and the fourth flowing port 214, depending on which of the above-mentioned route the multi-communicative valve unit 20 is operated. When two particular ports are communicated, it means that fluid, such as the refrigerant mentioned above, is capable of flowing through the two corresponding port in either direction. For example, when the first flowing port 211 and the second flowing port 212 are communicated, the refrigerant is capable of flowing from the first flowing port 211 to the second flowing port 212 of the four-way valve 21, and vice versa.

On the other hand, the multi-communicative valve 22 comprises an elongated main body 220 having a plurality of communicative ports formed thereon, wherein each of the communicative ports are connected with a corresponding connecting pipe 10 for connecting to a corresponding component in the air heating, air conditioning and water heating system of the present invention, such as the four-way valve, the compressor, the condenser, the heat exchanger, the water heater and etc. In this preferred embodiment, the elongated main body 220 has first through sixth communicative port 221, 222, 223, 224, 225, 226 as shown in FIG. 2 of the drawings. Moreover, the elongated main body 220 defines a receiving cavity 227 formed therein, wherein the first through six communicative port 221, 222, 223, 224, 225, 226 communicates the receiving cavity 227 with an exterior of the elongated main body 220. In this particular embodiment of the present invention, the first communicative port 221 and the second communicative port 222 are spacedly formed at one side of the elongated main body 220, while the third through sixth communicative port 223, 224, 225, 226 are spacedly formed at an opposed side of the elongated main body 220.

Figure 3:
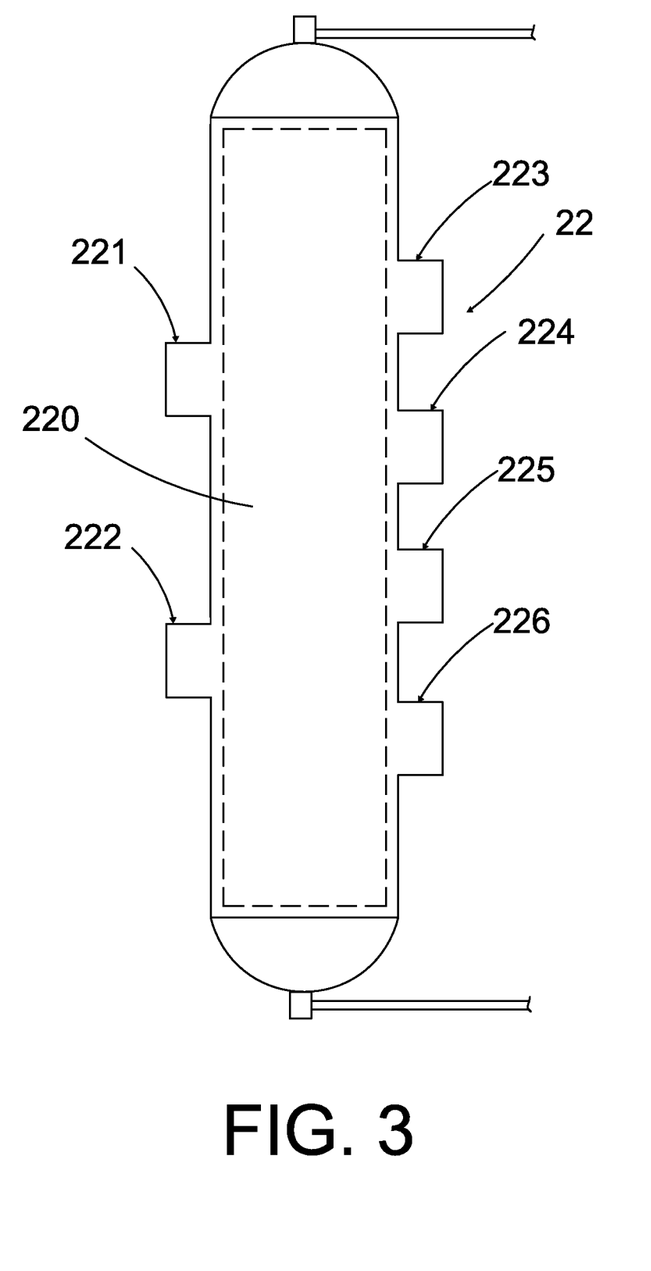
FIG. 3 is a schematic diagram of a multi-communicative valve of the air heating, air conditioning and water heating system according to a preferred embodiment of the present invention.

The multi-communicative valve 22 further comprises a first piston member 23, a second piston member 24 movably provided in the receiving cavity 227 of the elongated main body 220, and a connecting member 25 extended between the first piston member 23 and the second piston member 24 in such a manner that when one of the first piston member 23 and the second piston member 24 is driven to move, the other piston member 23 (24) is also driven to move through the connecting member 25. In other words, when the first piston member 23 is driven to move, the second piston member 24 is also driven to move through the connecting member 25, or when the second piston member 24 is driven to move, the first piston member 23 is also driven to move through the connecting member 25.

Moreover, the multi-communicative valve 22 further comprises a plurality of partitioning members 26 spacedly and movably mounted in the receiving cavity 227 to define a plurality of passage compartments 261, wherein the partitioning members 26 are connected to the connecting member 25 so as to be selectively moved to block fluid passage against at least one of the first through sixth communicative port 221, 222, 223, 224, 225, 226 so as to define the air conditioning route, the air heating route, and the water heating route mentioned above.

The first piston member 23 has a first transverse portion 231 connected to the corresponding end portion of the connecting member 25, and a first longitudinal portion 232 integrally and outwardly extended from the first transverse portion 231 to define a first piston cavity 233 within the first transverse portion 231 and the first longitudinal portion 232. Similarly, the second piston member 24 has a second transverse portion 241 connected to the corresponding end portion of the connecting member 25, and a second longitudinal portion 242 integrally and outwardly extended from the second transverse portion 241 to define a second piston cavity 243 within the second transverse portion 241 and the second longitudinal portion 242.

The multi-communicative valve 22 further has a first pressure port 27 and a second pressure port 28 formed at two end portions of the elongated main body 220 respectively, wherein the first pressure port 27 and the second pressure port 28 are communicated with the first and the second piston cavity 233, 243 respectively so that when a predetermined pressure differential is developed between the first pressure port 27 and the second pressure port 28, a corresponding pressure differential is also developed between the first piston cavity 233 and the second piston cavity 243, and this pressure differential is arranged to drive the first piston member 23 and the second piston member 24 to move longitudinally along the elongated main body 220. In this preferred embodiment, the pressure differential between the first pressure port 27 and the second pressure port 28 is accomplished by connecting the first pressure port 27 and the second pressure port 28 to a pressure pump device or compressor for selectively imparting high pressure air to the corresponding first piston cavity 233 or second piston cavity 243 to form the above-mentioned pressure differential between the first piston cavity 233 and the second piston cavity 243.

In order to prevent fluid leakage between each two adjacent passage compartment 26, the multi-communicative valve 22 further comprises a plurality of sealing members 29 provided between the partitioning members 26 and an inner sidewall of the elongated main body 220, the first piston member 23 and the inner sidewall of the elongated main body 220, and between the second piston member 24 and the inner to sidewall of the elongated main body 220 respectively.

According to the preferred embodiment of the present invention, and referring to FIG. 2 of the drawings, the water heater 70 comprises a first heating unit 71 defining a first heater inlet port 711 and a first heater outlet port 712, and a second heating unit 72 defining a second heater inlet port 721 and a second heater outlet port 722. The first heater inlet port 711 is connected to a compressor vapor outlet 32 of the compressor 30, while the first heater outlet port 712 is connected to the fourth flowing port 214 of the four-way valve 21. On the other hand, the second heater inlet port 721 is connected to the sixth communicative port 226 of the multi-communicative valve 22, while the second heater outlet port 722 is connected to the fourth communicative port 224 of the multi-communicative valve 22. Moreover, the compressor 30 further has a compressor inlet 31 connected to the first flowing port 211 of the four-way valve 21, preferably through an expansion tank 80.

The heat exchanger 50 has a first exchanger port 51 connected to the fifth communicative port 225 of the multi-communicative valve 22, and a second exchanger port 52 connected to the third communicative port 223 of the multi-communicative valve 22, wherein the refrigerant is arranged to enter and exit the heat exchanger 50 through the first exchanger port 51 and the second exchanger port 52.

The condenser 40 has a first condenser port 41 connected to the third flowing port 213 of the four-way valve 21, and a second condenser port 42 connected to the first communicative port 221 of the multi-communicative valve 22 through the expansion valve 60, wherein the refrigerant is arranged to enter and exit the condenser 40 through the first condenser port 41 and the second condenser port 42.

Figure 4:
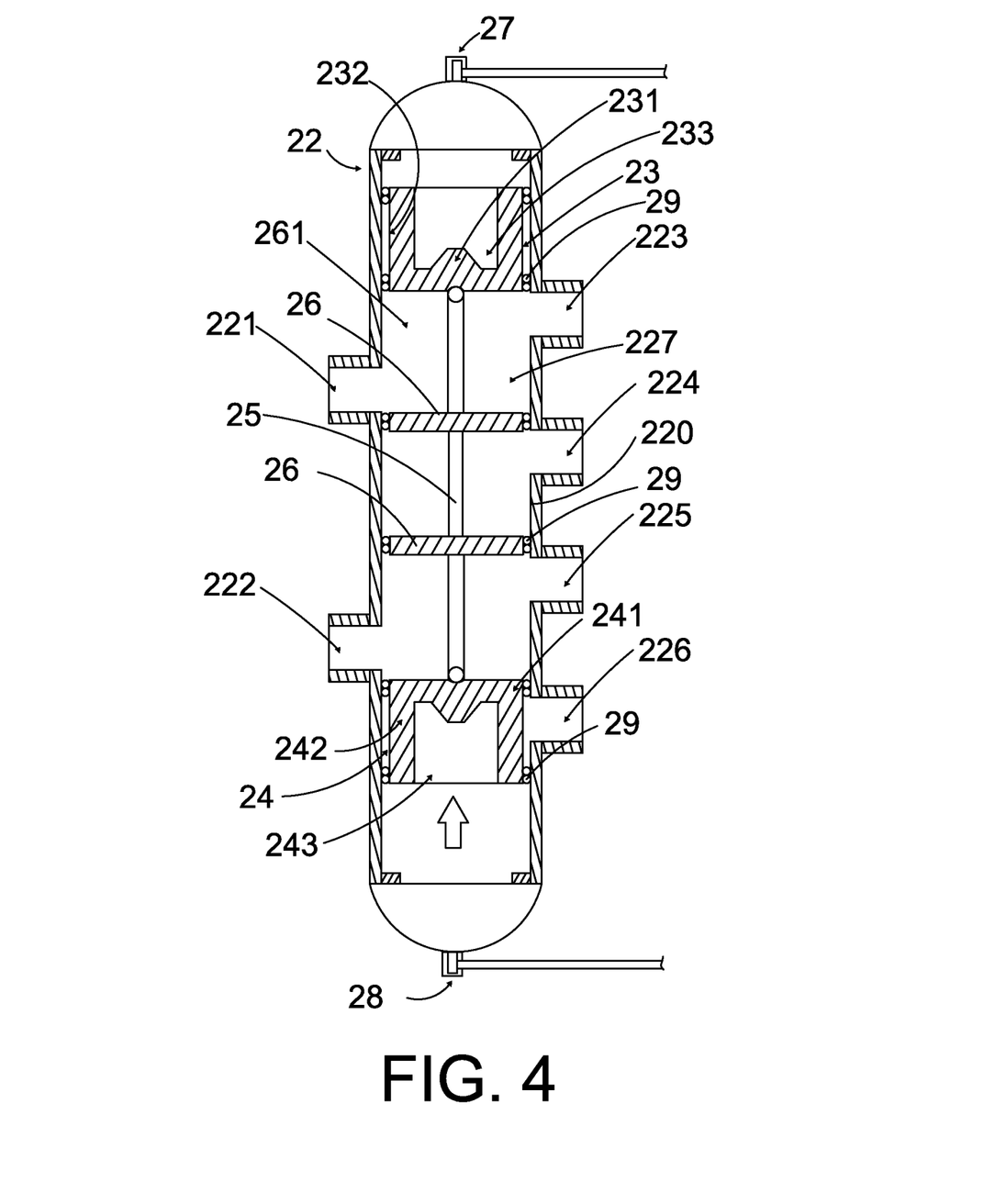
FIG. 4 is a sectional side view of the multi-communicative valve of the air heating, air conditioning and water heating system according to a preferred embodiment of the present invention, illustrating that the multi-communicative valve is operated to form the air conditioning route and the air heating route.

Referring to FIG. 4 of the drawings, when the multi-communicative valve unit 20 is operated to form the air conditioning route, the four-way valve 21 is controlled such that the fourth flowing port 214 and the third flowing port 213 are communicated, while the first flowing port 211 and the second flowing port 212 are communicated. On the other hand, the multi-communicative valve 22 is operated such that the first piston member 23 and the second piston member 24 are upwardly and longitudinally moved for communicating the first communicative port 221 to the third communicative port 223 through the corresponding passage compartment 261, while the second communicative port 222 communicates with the fifth communicative port 225 through the corresponding passage compartment 261. Note that in this air conditioning route, the fourth communicative port 224 is blocked by a corresponding partitioning member 26 while the sixth communicative port 226 is blocked by the second piston member 24.

Thus, the refrigerant in superheated vapor state is arranged to sequentially flow into the water heater 70 at the first heater inlet port 711 from the compressor vapor outlet 32 of the compressor 30 for releasing a predetermined of heat into the water stored in the water heater 70 so as to produce a predetermined amount of heated water. The refrigerant leaving the water heater 70 from the first heater outlet port 712 is guided to flow to the fourth flowing port 214 of the four-way valve 221 and leave the four-way valve 221 from the third flowing port 213. The refrigerant leaves the four-way valve 21 from the third flowing port 213 and is guided to flow to the condenser 40 at the first condenser port 41 for extracting a predetermined amount of heat to the first predetermined heat exchange medium flowing through the condenser 40. The refrigerant leaving the condenser 40 from the second condenser port 42 is arranged to flow through the expansion valve 60 and enters the multi-communicative valve 22 at the first communicative port 221, which is communicated to the third communicative port 223. The refrigerant thus leaves the multi-communicative valve 22 from the third communicative port 223 and enters the heat exchanger 50 at the second exchanger port 52. The refrigerant then leaves the heat exchanger 50 from the first exchanger port 51 and enters the multi-communicative valve 22 through the fifth communicative port 225, which, as mentioned above, is communicated with the second communicative port 222 through the corresponding passage compartment 226. The second communicative port 222 is communicated with the second flowing port 212 of the four-way valve 21. The refrigerant thus enters the four-way valve 21 through the second flowing port 212 and exits the four-way valve 21 through the first flowing port 211. The refrigerant is then guided to flow back to the compressor 30, preferably through an expansion tank 80.

When the multi-communicative valve unit 20 is operated to form the air heating route, the four-way valve 21 is controlled such that the fourth flowing port 214 and the second flowing port 212 are communicated, while the first flowing port 211 and the third flowing port 213 are communicated. On the other hand, the multi-communicative valve 22 is operated such that the first piston member 23 and the second piston member 24 are upwardly and longitudinally moved for communicating the first communicative port 221 to the third communicative port 223 through the corresponding passage compartment 261, while the second communicative port 222 communicates with the fifth communicative port 225 through the corresponding passage compartment 261. Note that in this air heating route, the fourth communicative port 224 is blocked by a corresponding partitioning member 26 while the sixth communicative port 226 is blocked by the second piston member 24.

Thus, the refrigerant in superheated vapor state is arranged to sequentially flow into the water heater 70 at the first heater inlet port 711 from the compressor vapor outlet 32 of the compressor 30 for releasing a predetermined of heat into the water stored in the water heater 70 so as to produce a predetermined amount of heated water. The refrigerant leaving the water heater 70 from the first heater outlet port 712 is guided to flow to the fourth flowing port 214 of the four-way valve 21. The refrigerant exits the four-way valve 21 from the second flowing port 212 and is guided to flow to the second communicative port 222 of the multi-communicative valve 22.

The refrigerant leaves the multi-communicative valve 22 from the fifth communicative port 225 and is guided to flow into the heat exchanger 50 through the first exchanger port 51 for extracting a predetermined amount of heat to the second predetermined heat exchange medium. The refrigerant then leaves the heat exchanger 50 from the second exchanger port 52 and flows back to the multi-communicative valve 22 through the third communicative port 223. The refrigerant leaves the multi-communicative valve 22 from the first communicative port 221 and is guided to flow into the second condenser port 42 of the condenser 40, preferably through the expansion valve 60 for absorbing a predetermined amount of heat from the first predetermined heat exchange medium. The refrigerant leaves the condenser 40 through the first condenser port 41 and is arranged to flow into four-way valve 21 through the third flowing port 213, which is communicated with the first flowing port 211. The refrigerant leaves the four-way valve 21 and is guided to flow back to the compressor inlet 31 of the compressor 30, preferably through the expansion tank 80 to perform another heat exchange cycle for producing air heating.

Figure 5:
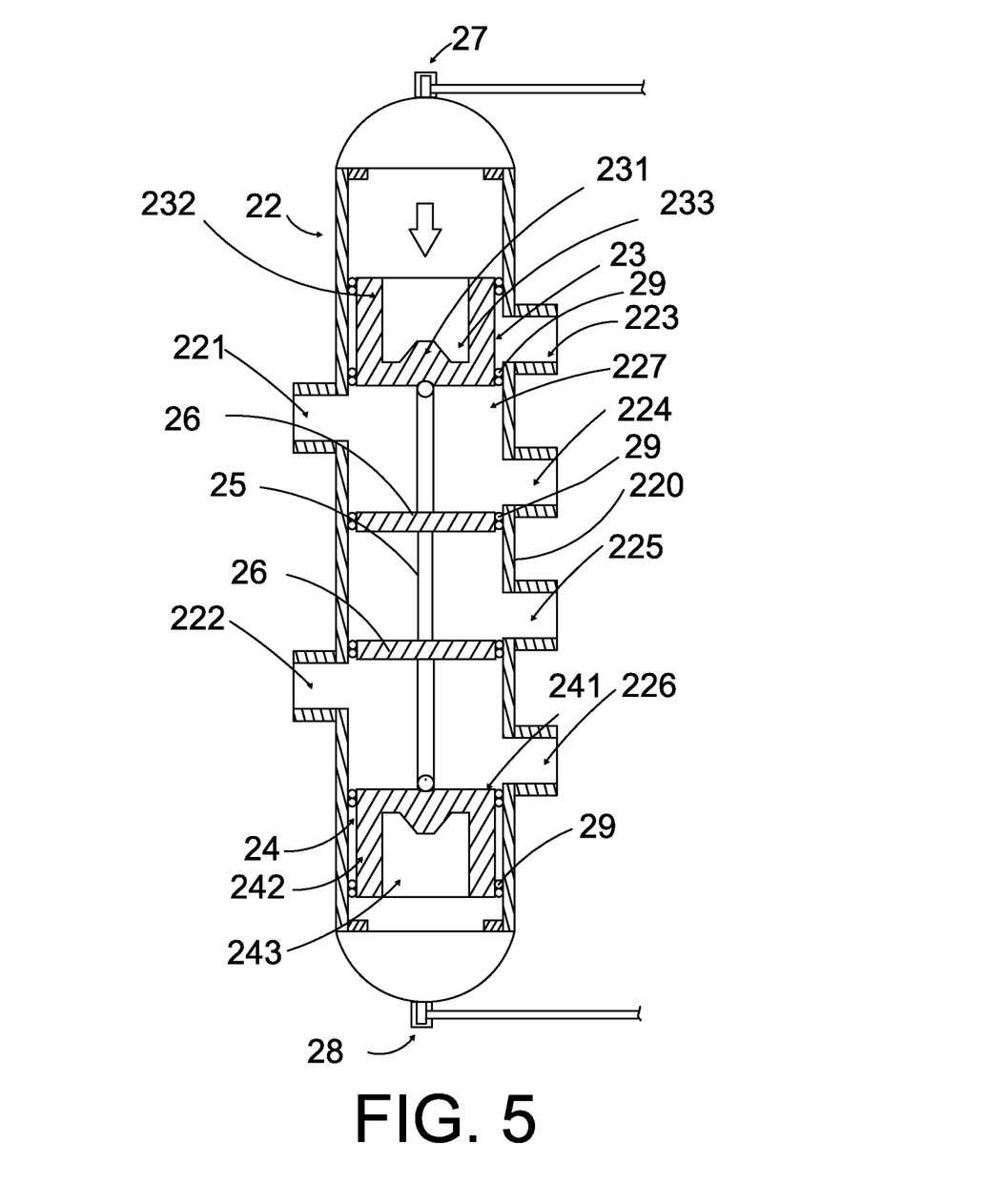
FIG. 5 is a sectional side view of the multi-communicative valve of the air heating, air conditioning and water heating system according to a preferred embodiment of the present invention, illustrating that the multi-communicative valve is operated to form the water heating route.

As shown in FIG. 5 of the drawing, when the multi-communicative valve unit 20 is operated to form the water heating route, the four-way valve 21 is controlled such that the fourth flowing port 214 and the second flowing port 212 are communicated, while the first flowing port 211 and the third flowing port 213 are communicated. On the other hand, the multi-communicative valve 22 is operated such that the first piston member 23 and the second piston member 24 are downwardly and longitudinally moved for communicating the first communicative port 221 to the fourth communicative port 224 through the corresponding passage compartment 261, while the second communicative port 222 communicates with the sixth communicative port 226 through the corresponding passage compartment 261. Note that in this water heating route, the third communicative port 223 is blocked by the first piston member 23 while the fifth communicative port 225 is blocked by corresponding partitioning member 26.

When the multi-communicative valve unit 20 is operated to establish the water heating route, the refrigerant in superheated vapor state is arranged to sequentially flow into the first heater inlet port 711 of the water heater 70 from the compressor vapor outlet 32 of the compressor 30, the refrigerant then exits the water heater 70 through the first heater outlet port 712. The refrigerant leaving the water heater 70 is guided to flow into the four-way valve 21 through the fourth flowing port 214 and exit the four-way valve 21 through the second flowing port 212. The refrigerant leaving the four-way valve 21 is then guided to flow into the multi-communicative valve 22 through the second communicative port 222, which is communicated with the sixth communicative port 226. In other words, the refrigerant flows out of the multi-communicative valve 22 through the sixth communicative port 226 and re-enters the water heater 70 through the second heater inlet port 721.

After entering the water heater 70, the refrigerant is adapted for releasing a predetermined amount of heat to the water stored in the water heater 70 so as to produce a predetermined amount of heated water. The refrigerant leaves the water heater 70 from the second heater outlet port 722 and is guided to flow into the fourth communicative port 224 of the multi-communicative valve 22, which is communicated with the first communicative port 221. The refrigerant leaves the multi-communicative valve 22 and is guided to flow to the second condenser port 42 of the condenser 40 (preferably through the expansion valve 60) for absorbing heat from the first predetermined heat exchange medium. The refrigerant leaves the condenser 40 from the first condenser port 41 and is arranged to flow to the third flowing port 213 of the four-way valve 21. The refrigerant leaves the four-way valve 21 from the first flowing port 211 and is guided to flow back to the compressor 30 through the compressor inlet 31 to perform another heat exchange cycle for producing heated water in the water heater 70.

One skilled in the art will understand that the embodiment of the present invention as shown in the drawings and described above is exemplary only and not intended to be limiting. It can be appreciated that the objects of the present invention have been fully and effectively accomplished. The above-described embodiments have been shown and described for the purposes of illustrating the functional and structural principles of the present invention and is subject to change without departure from the spirit and the main patentable subject matter of the present invention. Therefore, this invention includes all modifications encompassed within the spirit and scope of the following claims.

What is claimed is:

1. An air heating, air conditioning and water heating system, comprising:

a plurality of connecting pipes adapted for carrying a flow of a predetermined amount of refrigerant; a multi-communicative valve unit; a compressor arranged for compressing said refrigerant in a state of superheated vapor; a condenser communicated with said compressor through said multi-communicative valve unit and said connecting pipes, wherein a first predetermined amount of heat exchange medium circulates through said condenser; a heat exchanger communicated with said condenser through said multi-communicative valve unit and said connecting pipes, wherein a second predetermined amount of heat exchange medium circulates through said heat exchanger; an expansion valve communicative between said heat exchanger and said condenser; and a water heater communicated with said heat exchanger and said compressor through said multi-communicative valve unit and said connecting pipes, wherein said water heater is arranged to store a predetermined amount of water, wherein said multi-communicative valve unit is arranged to be operated to selectively establish at least an air conditioning route and an air heating route for said refrigerant, (i) wherein in said air conditioning route, said refrigerant in superheated vapor state is arranged to sequentially flow into said water heater from said compressor for releasing a predetermined amount of heat into said water stored in said water heater for producing a predetermined amount of heated water, wherein said refrigerant leaving said water heater is guided to flow into said condenser through said multi-communicative valve trait for extracting a predetermined amount of heat to said first predetermined heat exchange medium, wherein said refrigerant leaving said condenser is arranged to flow into said heat exchanger through said expansion valve and said multi-communicative valve unit for absorbing a predetermined amount of heat from said second predetermined heat exchange medium, wherein said refrigerant leaving said heat exchanger is arranged to flow into said compressor through said multi-communicative valve unit to perform another heat exchange cycle for producing refrigeration;

(ii) wherein in said air heating route, said refrigerant in superheated vapor state is arranged to sequentially flow into said water heater from said compressor for releasing a predetermined amount of heat into said water stored in said water heater for producing a predetermined amount of heated water, wherein said refrigerant leaving said water heater is guided to flow into said heat exchanger through said multi-communicative valve unit for extracting a predetermined amount of heat to said first predetermined heat exchange medium, wherein said refrigerant leaving said heat exchanger is arranged to flow into said condenser through said expansion valve and said multi-communicative valve unit for absorbing a predetermined amount of heat from said second predetermined heat exchange medium, wherein said refrigerant leaving said condenser is arranged to flow into said compressor through said multi-communicative valve unit to perform another heat exchange cycle for producing air heating; and (iii) wherein said multi-communicative valve unit is arranged to be operated to selectively establish a water heating route in additional to said air conditioning route and said air heating route for said refrigerant, wherein in said water heating route, said refrigerant in superheated vapor state is arranged to sequentially flow into said water heater from said compressor for releasing a predetermined amount of heat to said water stored in said water heater, wherein said refrigerant leaving said water heater is guided to flow into said condenser through said multi-communicative valve unit for absorbing heat from said first predetermined heat exchange medium, wherein said refrigerant leaving said condenser is arranged to flow into said compressor through said multi-communicative valve unit to perform another heat exchange cycle for producing heated water in said water heater.

2. The air heating, air conditioning and water heating system, as recited in claim 1, wherein said multi-communicative valve unit comprises a four-way valve and a multi-communicative valve connected to said four-way valve, wherein said multi-communicative valve comprises an elongated main body having a plurality of communicative ports formed thereon, wherein each of said communicative ports is connected with one of said corresponding connecting pipes for connecting to one of said four-way valve, said compressor, said condenser, said heat exchanger, and said water heater.

3. The air heating, air conditioning and water heating system, as recited in claim 2, wherein said elongated main body has altogether six communicative ports which are embodied as first through sixth communicative port, wherein said elongated main body defines a receiving cavity formed therein, wherein said first through six communicative port communicates said receiving cavity with an exterior of said elongated main body.

4. The air heating, air conditioning and water heating system, as recited in claim 3, wherein said first communicative port and said second communicative port are spacedly formed at one side of said elongated main body, while said third through sixth communicative port are spacedly formed at an opposed side of said elongated main body.

5. The air heating, air conditioning and water heating system, as recited in claim 4, wherein said four-way valve comprises a valve body, and has first through fourth flowing port formed on said valve body and are connected with said corresponding connecting pipes respectively, wherein said first flowing port is selectively communicated with one of said second flowing port and said third flowing port, and said second flowing port is selectively communicated with one of said first flowing port and said fourth flowing port.

6. The air heating, air conditioning and water heating system, as recited in claim 5, wherein said multi-communicative valve further comprises a first piston member, a second piston member movably provided in said receiving cavity of said elongated main body, and a connecting member extended between said first piston member and said second piston member in such a manner that when one of said first piston member and said second piston member is driven to move, said remaining piston member is also driven to move through said connecting member.

7. The air heating, air conditioning and water heating system, as recited in claim 6, wherein said multi-communicative valve further comprises a plurality of partitioning members spacedly and movably mounted in said receiving cavity to define a plurality of passage compartments, wherein said partitioning members are connected to said connecting member so as to be selectively moved to block fluid passage against at least one of said first through sixth communicative port, thereby defining said air conditioning route, said air heating route, and said water heating route.

8. The air heating, air conditioning and water heating system, as recited in claim 7, wherein said first piston member has a first transverse portion connected to said corresponding end portion of said connecting member, and a first longitudinal portion integrally and outwardly extended from said first transverse portion to define a first piston cavity within said first transverse portion and said first longitudinal portion, wherein said second piston member has a second transverse portion connected to said corresponding end portion of said connecting member, and a second longitudinal portion integrally and outwardly extended from said second transverse portion to define a second piston cavity within said second transverse portion and said second longitudinal portion.

9. The air heating, air conditioning and water heating system, as recited in claim 8, wherein said multi-communicative valve further has a first pressure port and a second pressure port formed at two end portions of said elongated main body respectively, wherein said first pressure port and said second pressure port are communicated with said first and said second piston cavity respectively so that when a predetermined pressure differential is developed between said first pressure port and said second pressure port, a corresponding pressure differential is also developed between said first piston cavity and said second piston cavity for driving said first piston member and said second piston member to move longitudinally along said elongated main body.

10. The air heating, air conditioning and water heating system, as recited in claim 9, wherein said multi-communicative valve further comprises a plurality of sealing members provided between said partitioning members and an inner sidewall of said elongated main body, between said first piston member and said inner sidewall of said elongated main body, and between said second piston member and said inner sidewall of said elongated main body respectively.

11. The air heating, air conditioning and water heating system, as recited in claim 10, wherein said compressor has a compressor vapor outlet, wherein said water heater comprises a first heating unit defining a first heater inlet port and a first heater outlet port, and a second heating unit defining a second heater inlet port and a second heater outlet port, wherein said first heater inlet port is connected said compressor vapor outlet, while said first heater outlet port is connected to said fourth flowing port of said four-way valve, wherein said second heater inlet port is connected to said sixth communicative port of said multi-communicative valve, while said second heater outlet port is connected to said fourth communicative port of said multi-communicative valve.

12. The air heating, air conditioning and water heating system, as recited in claim 11, wherein said compressor further has a compressor inlet connected to said first flowing port of said four-way valve.

13. The air heating, air conditioning and water heating system, as recited in claim 12, wherein said heat exchanger has a first exchanger port connected to said fifth communicative port of said multi-communicative valve, and a second exchanger port connected to said third communicative port of said multi-communicative valve, wherein said refrigerant is arranged to enter said heat exchanger through one of said first exchanger port and said second exchanger port, and exit said heat exchanger through said remaining first exchanger port and said second exchanger port.

14. The air heating, air conditioning and water heating system, as recited in claim 13, wherein said condenser has a first condenser port connected to said third flowing port of said four-way valve, and a second condenser port connected to said first communicative port of said multi-communicative valve, wherein said refrigerant is arranged to enter said condenser through one of said first condenser port and said second condenser port, and exit said condenser through said remaining first condenser port and said second condenser port.

15. The air heating, air conditioning and water heating system, as recited in claim 14, wherein when said multi-communicative valve unit is operated to form said air conditioning route, said four-way valve is controlled such that said fourth flowing port and said third flowing port are communicated, while said first flowing port and said second flowing port are communicated, wherein said multi-communicative valve is operated such that said first piston member and said second piston member are upwardly and longitudinally moved for communicating said first communicative port to said third communicative port through said corresponding passage compartment, while said second communicative port communicates with said fifth communicative port through said corresponding passage compartment, so that said fourth communicative port is blocked by a corresponding partitioning member while said sixth communicative port is blocked by said second piston member, wherein when said multi-communicative valve unit is operated to form said air heating route, said four-way valve is controlled such that said fourth flowing port and said second flowing port are communicated, while said first flowing port and said third flowing port are communicated, wherein said multi-communicative valve is operated such that said first piston member and said second piston member are upwardly and longitudinally moved for communicating said first communicative port to said third communicative port through said corresponding passage compartment, while said second communicative port communicates with said fifth communicative port through said corresponding passage compartment, so that said fourth communicative port is blocked by a corresponding partitioning member while said sixth communicative port is blocked by said second piston member, and wherein when said multi-communicative valve unit is operated to form said water heating route, said four-way valve is controlled such that said fourth flowing port and said second flowing port are communicated, while said first flowing port and said third flowing port are communicated, wherein said multi-communicative valve is operated such that said first piston member and said second piston member are downwardly and longitudinally moved for communicating said first communicative port to said fourth communicative port through said corresponding passage compartment, while said second communicative port communicates with said sixth communicative port through said corresponding passage compartment, wherein said third communicative port is blocked by said first piston member while said fifth communicative port is blocked by corresponding partitioning member.

\* \* \* \* \*